United States Patent Office 3,043,785
Patented July 10, 1962

3,043,785
DEPIGMENTING POLYMERIC COMPOSITIONS WITH ALIPHATIC CARBOXYLIC ACID SETTLING AIDS
Palmer W. Wright, Midland, Bernie A. Kozakiewicz, Bay City, and Arthur F. Roche, Freeland, Mich., assignors to The Dow Chemical Company, Midland, Mich., a corporation of Delaware
No Drawing. Filed July 15, 1958, Ser. No. 748,592
13 Claims. (Cl. 260—2.3)

This invention relates to an improved method for depigmenting polymeric compositions in order to reclaim the polymeric constituent therefrom for subsequent reuse in place of or in combination with virgin polymer stock.

It is a common practice to pigment polymer compositions for coloration, delustering and various other purposes. Among the more popular inorganic pigments, for example, are cadium and selenium compounds, titania, the several chromium oxides and the like. In order to reclaim and recover the polymer constituent from pigmented polymeric compositions, it is usually necessary to dissolve the composition in a suitable solvent therefor and to filter the resulting solution free from the insoluble pigment contained therein. This may oftentimes be a difficult and tedious process and one that may frequently be rendered even more painstaking by the impossibility of rapidly filtering the solution, due to the tendency of many pigments to remain suspended in and to settle very slowly from the solution that is made of the pigmented polymeric composition (usually scrap material) being reclaimed.

It is the principal object of the present invention to provide an improved method for depigmenting polymer compositions to facilitate the easier and more economically attractive reclamation and recovery of the polymer constituent thereof. Other objects, advantages and benefits of the invention will be manifest in the ensuing description and specification.

To this end, pigmented polymeric compositions may advantageously be depigmented by practice of a method in accordance with the method of the present invention which comprises dissolving a pigmented polymeric composition that is desired to be reclaimed in a suitable non-reactive, water-insoluble, organic solvent that beneficially, if possible, may be a hydrocarbon or closely-related solvent; intimately mixing the resulting organic solution containing the dispersed pigment with an aqueous phase that is adapted to accelerate pigment settling and which contains dissolved therein a water-soluble chemical settling aid that is non-reactive with the polymer and which is a water-soluble aliphatic carboxylic (including polycarboxylic) acid that contains no more than 5 (and, preferably, no more than 3) carbon atoms in its molecule; and then separating the organic polymer solution from the pigment and the aqueous phase, advantageously by settling the organic polymer solution from the aqueous phase; separating the organic polymeric solution from the aqueous phase; filtering the separated polymeric solution; and subsequently isolating and recovering the reclaimed and depigmented polymer.

In many cases it is extremely advantageous to incorporate a minor proportion of a water-soluble cellulose ether derivative, such as methyl cellulose and the like, in the aqueous phase before its intimate mixture with the organic polymer solution. This facilitates flocculation of the pigment in such a manner that the major proportion of the precipitate settles out in a clean and direct manner, as at the liquid interface or on the bottom of the container in which the depigmentation is being conducted (when sedimentation techniques are being used for separation), without tending to accumulate on the side walls of the container or at any other point outside of that substantially encompassed by the stratified aqueous phase layer. By such means, decantation of the organic polymer solution in order to separate it from the aqueous phase after the mixing and settling of the two is made much easier and appreciably more efficient. It also facilitates complete isolation of the polymer solution by filtration or centrifugation procedures for pigment separation, when performed either prior to or after the separation of the liquid phases.

Practice of the method of the present invention conveniently permits the effective and efficient depigmentation and reclamation of scrap polymer. The reclaimed product is generally obtained in a condition of purity and freedom from contamination by pigment materials that is equivalent to that of virgin stock with the desired result being achieved with utmost expedience and minimized operational difficulty.

Any synthetic, thermoplastic polymeric material can be reclaimed from scrap or other pigmented compositions by the procedure of the present invention. For example, various polyamide (such as nylon "66" and nylon "6"), polyester (such as polyethylene terephthalate and the like), acrylonitrile polymer (including polyacrylonitrile and the other known fiber-forming copolymers of acrylonitrile), haloethylene polymer (including vinyl chloride and saran resins), non-aromatic hydrocarbon polyolefin (including polyethylene and polypropylene) and the like thermoplastic resinous polymers that are capable of being dissolved in suitable, organic preferably, hydrocarbon, water-insoluble solvent media can be depigmented in this manner. Advantageously, however, the invention may be practiced with various "vinyl aromatic resins" which, as the term is conventionally understood, includes the normally solid polymers of such vinyl aromatic compounds that contain from 6 to about 10 carbon atoms (including the carbon atoms in alkyl substituents) in the aromatic portion of the compound as styrene, the several chlorostyrenes, the several methyl styrenes (including vinyl toluene), the several ethyl styrenes, vinyl naphthalene and the like as well as the solid resinous copolymers of such compounds with one another and with other unsaturated monomeric materials including acrylonitrile, methyl methacrylate, ethyl acrylate, α-methyl styrene and other monoethylenically unsaturated monomers and divinyl benzene, diallyl maleate and the like.

Any non-reactive, water-insoluble, organic solvent liquid may be employed in the practice of the invention for dissolving the scrap polymer composition that is to be depigmented and reclaimed. Obviously, the particular solvent that is used depends on the particular polymer that is involved. For styrene polymers, including polystyrene, it is generally suitable to employ ethyl benzene, xylene, toluene, and the like or an equivalent water-insoluble aromatic hydrocarbon solvent among the known water-insoluble for such polymers. When certain copolymeric styrene polymers, such as copolymers of styrene and acrylonitrile, are involved, it may sometimes be preferable to employ relatively more polar solvents, such as methyl ethyl ketone and the like, for their dissolution. Although it is preferred, as a matter of expedience, to utilize a solvent that is practically effective at normal room temperatures and under normal atmospheric pressure, it is possible to accomplish the dissolution and it is generally advantageous to conduct the method of the invention at elevated temperatures. It is also possible to employ superatmospheric pressures in combination with an elevated dissolving and treating temperature. In most cases, however, it may be found better to avoid greater than atmospheric pressures in view of the operational difficulties that may thus be involved. As is apparent, any concentration of the scrap polymer may be made in the solution that is to be depigmented. Ordinarily, if possible, it is advantageous for at least about 5 percent and preferably at least about 10 percent by weight of the pigmented polymer to be dissolved in the organic solvent. This avoids the inconvenience of handling larger than necessary volumes of the desired polymer in solution while permitting a suitable settling effect to be accomplished during the depigmentation process.

The amount of the settling aid that may be incorporated in the aqueous phase with which the dissolved polymer solution is treated may be found to vary over a wide range depending upon the characteristics of the particular settling agent that is utilized when one is being employed and upon the nature and quantity of the pigment that is being removed from the polymer composition being reclaimed. It is ordinarily beneficial when it is possible to do so for the aqueous phase to contain between about 0.5 and 50 percent by weight based on the weight of the aqueous solution of the chemical settling aid that is employed. It is generally more practical for the aqueous phase to contain at least about 10 percent by weight of the chemical settling aid. The precise amount of the settling aid that is employed may, of course, vary with the particular characteristics of the material and the volume of water that is actually used in the aqueous phase. As a safe rule of thumb, it is usually suitable to employ a quantity of the settling aid to be dissolved in the aqueous phase for each treatment of the organic polymer solution that is about one-half to fifty times by weight the weight of the pigment being removed from the polymer composition. In many cases it may be suitable and preferred for an amount of settling aid to be employed that is not more than twenty times the weight of the pigment.

The relative quantity of the organic polymer solution and the aqueous treating phase may also vary over wide ranges. As little, for example, as about 1 to as much as about 9 parts by weight or more of aqueous phase for each part by weight of polymeric solution that is being treated may be satisfactorily employed. It is generally preferred for the weight ratio of the organic polymer solution to the aqueous treating phase to be about two or three to one, respectively.

Typical of the aliphatic carboxylic acid settling aids that may be utilized are acetic acid, propionic acid and oxalic acid.

Besides methyl cellulose, other water-soluble cellulose ether derivatives may also be incorporated with advantage in the aqueous phase in order to obtain better precipitation of the pigment. These include such materials as carboxymethyl cellulose, hydroxypropyl methyl cellulose and the like which may be employed in viscosity grades between about 10 and 2,000, preferably about five hundred, centipoises as determined by measurement of their two percent aqueous solutions at room temperature. It is ordinarily satisfactory to employ between about 0.10 and 1 percent by weight of the cellulose ether derivative in the aqueous phase, based on the weight of the aqueous solution. It is usually advantageous to employ between about 0.10 and 0.25 percent by weight of the cellulose derivative.

The intimate mixture of the phases during the actual depigmentation interval may be accomplished by any conventional mixing or physical agitating technique using ordinary apparatus for such purpose. Usually, at room temperatures, each treatment may be accomplished within an hour before separating the phases. When elevated temperatures are employed during the intermixing of the phases, shorter periods of time (as, for example, 10 minutes or less) may be found to suffice. After settling, the organic polymeric solution may be separated from the usually heavier aqueous phase in any desired manner that is conventionally employed for such purposes, including, for example, sedimentation and decantation and other separatory techniques. After the dissolved polymer has been filtered, subsequent to its depigmentation, it may be isolated in any desired manner, including solvent stripping, precipitation in a liquid vehicle followed by filtration and the like.

Alternatively, as has been indicated, the depigmented polymer solution may be isolated and separated from the settled pigment by filtering or centrifuging it prior to the phase separation of the immiscible liquids, or subsequent thereto if the settling of the pigment out of the organic phase has not gone to completion before their separation upon stratification.

The invention is further illustrated in and by the following examples, wherein unless otherwise indicated, all parts and percentages are to be taken by weight.

Example I

About three parts of a saturated aqueous solution (containing less than about 50 percent) of oxalic acid in distilled water was added to about seven parts of a solution containing about 10 percent of polystyrene pigmented with about 2 percent by weight of titanium dioxide, in toluene. The two phases were shaken together and intimately intermixed for about 10 minutes at a temperature of 80 to 85° C. after which they were allowed to settle. The depigmented organic polymeric solution was then decanted and subjected to a spectrophotometric light transmission test, using a model "B" Beckman spectrophotometer with light having a wave length of about 550 $\mu\mu$, measured through a cell in which the solution was contained having a thickness of about 1 centimeter. After about 15 minutes' settling, a 3 percent transmission reading was obtained. This corresponded to the reading that was obtained with a standard solution of the same type in which 90 percent of the pigment had been known to have settled out. In comparison, the same solution of the pigmented polymer in toluene (without having been treated as above) was found, after 15 minutes settling, to have 0 percent light transmission.

Upon recovery of the polymer from the organic solution that had been depigmented with the aqueous solution of oxalic acid, the polystyrene (which was reclaimed by vacuum devolatilization of the solvent vehicle for 2 hours at 4 mm. Hg and 150° C.) had properties and color about as good as virgin polymer styrene.

Example II

The procedure of Example I is repeated with about 28 parts of the same organic polymer solution and 12 parts of an aqueous phase, excepting that the aqueous phase consists of a 40 percent aqueous solution of acetic acid. After shaking and settling in the same way, the depigmented organic solution is found to have a 3 percent light transmission reading, corresponding to that obtained in a standard solution in which 90 percent of the pigment has been settled out.

Example III

The procedure of the first two examples is repeated, excepting to dissolve about 1 percent by weight of methyl cellulose, having a viscosity rating of about 500 centipoises, in each of the aqueous phases. The flocks of pigment which are formed deposit directly at the interface between the aqueous and the organic solutions without accumulating or depositing on the side wall of the vessel. Quantities of the cellulose ether as low as 0.1 percent by weight also provide highly satisfactory facilitation of the flocculation of the settled pigment.

Similar excellent results may be obtained when other water-soluble aliphatic carboxylic acid settling aids of the indicated varieties are employed for the depigmentation and other materials are removed from other polystyrene and analogous polymer compositions of the varieties mentioned.

The scope and purview of the present invention is to be gauged in the light of the hereto appended claims rather than strictly from the foregoing illustrative description and specification.

What is claimed is:

1. Method for depigmenting synthetic, thermoplastic polymeric compositions which comprises dissolving a pigmented polymeric composition containing an inorganic pigment that is insoluble in solvents in which said polymeric composition is dissolved in a water-insoluble organic solvent for said polymeric composition that is non-reactive with said polymer and said pigments and in which said pigment is insoluble; intimately mixing each part by weight of the resulting organic solution containing the dispersed pigment with between about 1 and 9 parts by weight of an aqueous phase that contains dissolved therein between about 0.5 and 50 weight percent, based on the weight of the aqueous phase, of a water-soluble aliphatic carboxylic acid that contains not more than about 5 carbon atoms in its molecule; and then physically separating the organic polymeric solution from the settled pigment and the aqueous phase.

2. The method of claim 1 and including the additional step of dissolving between about 0.1 and 1.0 percent by weight of a water-soluble cellulose ether derivative in said aqueous phase.

3. The method of claim 2, wherein between about 0.1 and 0.25 percent by weight of the cellulose ether is dissolved in said aqueous phase.

4. The method of claim 2, wherein the cellulose ether derivative is methyl cellulose.

5. The method of claim 1, wherein said water-soluble, aliphatic carboxylic acid is oxalic acid.

6. The method of claim 1, wherein said water-soluble, aliphatic carboxylic acid is acetic acid.

7. The method of claim 1, wherein the quantity of settling aid that is added to said solution is an amount that is from about one-half to fifty times by weight the quantity of pigment being removed from the polymeric composition.

8. The method of claim 1, wherein the organic polymer solution contains at least about 5 percent by weight based on the weight of the solution, of the polymeric composition that is to be depigmented.

9. The method of claim 1, wherein between about 10 and 35 percent by weight of the aqueous phase is employed for treating the polymeric solution that is being depigmented, based on the total weight of the aqueous phase and the organic polymer solution.

10. The method of claim 1, wherein the polymer is a vinyl aromatic polymer.

11. The method of claim 1, wherein the polymer is polystyrene and the solvent is ethylbenzene.

12. The method of claim 1, wherein the polymer is polystyrene and the solvent is toluene.

13. The method of claim 1, wherein the organic polymeric solution and the aqueous phase are intermixed at an elevated, non-boiling temperature.

References Cited in the file of this patent

UNITED STATES PATENTS

| | | |
|---|---|---|
| 2,293,514 | Lister | Aug. 18, 1942 |
| 2,639,278 | Stott et al. | May 19, 1953 |
| 2,728,725 | Gloor | Dec. 27, 1955 |
| 2,744,029 | Kingsbury | May 1, 1956 |
| 2,914,492 | Bennett et al. | Nov. 24, 1959 |
| 2,915,482 | Nagle et al. | Dec. 1, 1959 |